(12) United States Patent
Meador et al.

(10) Patent No.: US 7,322,111 B2
(45) Date of Patent: Jan. 29, 2008

(54) BRUSH CUTTING DEVICE

(76) Inventors: Douglas C. Meador, 1560 Springfield Dr., Vinton, VA (US) 24179-6031; Marvin T. Meador, 4225 Hales Ford Rd., Moneta, VA (US) 24121

( * ) Notice: Subject to any disclaimer, the term of this patent is extended or adjusted under 35 U.S.C. 154(b) by 0 days.

(21) Appl. No.: 11/063,017

(22) Filed: Feb. 23, 2005

(65) Prior Publication Data

US 2006/0185174 A1  Aug. 24, 2006

(51) Int. Cl.
B26B 13/00 (2006.01)
(52) U.S. Cl. ............... 30/251; 30/248; 30/249; 30/250; 56/241
(58) Field of Classification Search ......... 30/244, 30/245, 248, 249, 250, 246, 251, 231, 235, 30/237, 238, 239; 56/239, 241, 240; 144/24.12, 144/34.1, 34.5, 4.1
See application file for complete search history.

(56) References Cited

U.S. PATENT DOCUMENTS

| | | | | | |
|---|---|---|---|---|---|
| 269,029 | A | * | 12/1882 | Durham ............... | 144/34.5 |
| 361,911 | A | * | 4/1887 | Weston ............... | 56/241 |
| 391,742 | A | * | 10/1888 | Gridley ............... | 56/241 |
| 518,129 | A | * | 4/1894 | Aufderheide .......... | 30/251 |
| 708,737 | A | * | 9/1902 | Rhodes ............... | 56/241 |
| 709,478 | A | * | 9/1902 | Fortney .............. | 83/604 |
| 804,426 | A | * | 11/1905 | Mullen ............... | 30/251 |
| 1,065,753 | A | * | 6/1913 | Whitney .............. | 30/250 |
| 1,178,889 | A | * | 4/1916 | Volland .............. | 30/235 |
| 1,585,572 | A | * | 5/1926 | Takacs ............... | 30/248 |
| 1,727,067 | A | * | 9/1929 | Keefe ................ | 56/241 |
| 1,799,624 | A | * | 4/1931 | Goodwin ............. | 30/248 |
| 1,995,251 | A | * | 3/1935 | Hoskins ............. | 56/241 |
| 2,236,955 | A | * | 4/1941 | Thompson ........... | 30/248 |
| 2,391,598 | A | * | 12/1945 | Serdich ............. | 30/229 |
| 2,449,561 | A | * | 9/1948 | McGary et al. ....... | 30/251 |
| 2,461,370 | A | * | 2/1949 | Carper .............. | 56/241 |
| 2,487,473 | A | * | 11/1949 | Peterson ............ | 30/241 |
| 2,776,535 | A | * | 1/1957 | Branske ............. | 56/241 |
| 2,984,907 | A | * | 5/1961 | Schmidt ............. | 30/248 |
| 3,203,094 | A | * | 8/1965 | Couture ............. | 30/250 |
| 3,279,063 | A | * | 10/1966 | Chalup .............. | 30/253 |
| 3,384,962 | A | * | 5/1968 | Duffy et al. ........ | 30/248 |
| 5,315,762 | A | * | 5/1994 | Dearman ............. | 30/231 |
| 5,682,679 | A | * | 11/1997 | Dorma ............... | 30/249 |
| 2003/0145470 | A1 | * | 8/2003 | Huang ............... | 30/249 |

* cited by examiner

Primary Examiner—Hwei-Siu C. Payer

(57) ABSTRACT

A lever actuated cutting tool that allows ground level cutting of shrubs and small trees from a standing position. The design of the cutting tool takes advantage of the principles of leverage and resistive force, and also incorporates a pendulum swing, to provide a tool that is able to generate a tremendous amount of cutting force. A padded handle is provided at the long end of the lever and a first sharpened steel blade is attached to the cutting end of the lever. The lever is rotate-ably attached to the fulcrum and the fulcrum lies on the ground during operation. A second sharpened steel blade is immovably attached to the base of the fulcrum, and the trunk of the shrub to be removed is positioned in between the two blades. The cutting action is accomplished by moving the lever downward toward the ground. The force applied by the user is multiplied by the lever and transferred to the first cutting blade. The resistive force supplied by the ground is transferred, via the base of the fulcrum, to the second cutting blade. And the pendulum swing motion allows the first blade to pass cleanly over the second blade.

14 Claims, 3 Drawing Sheets

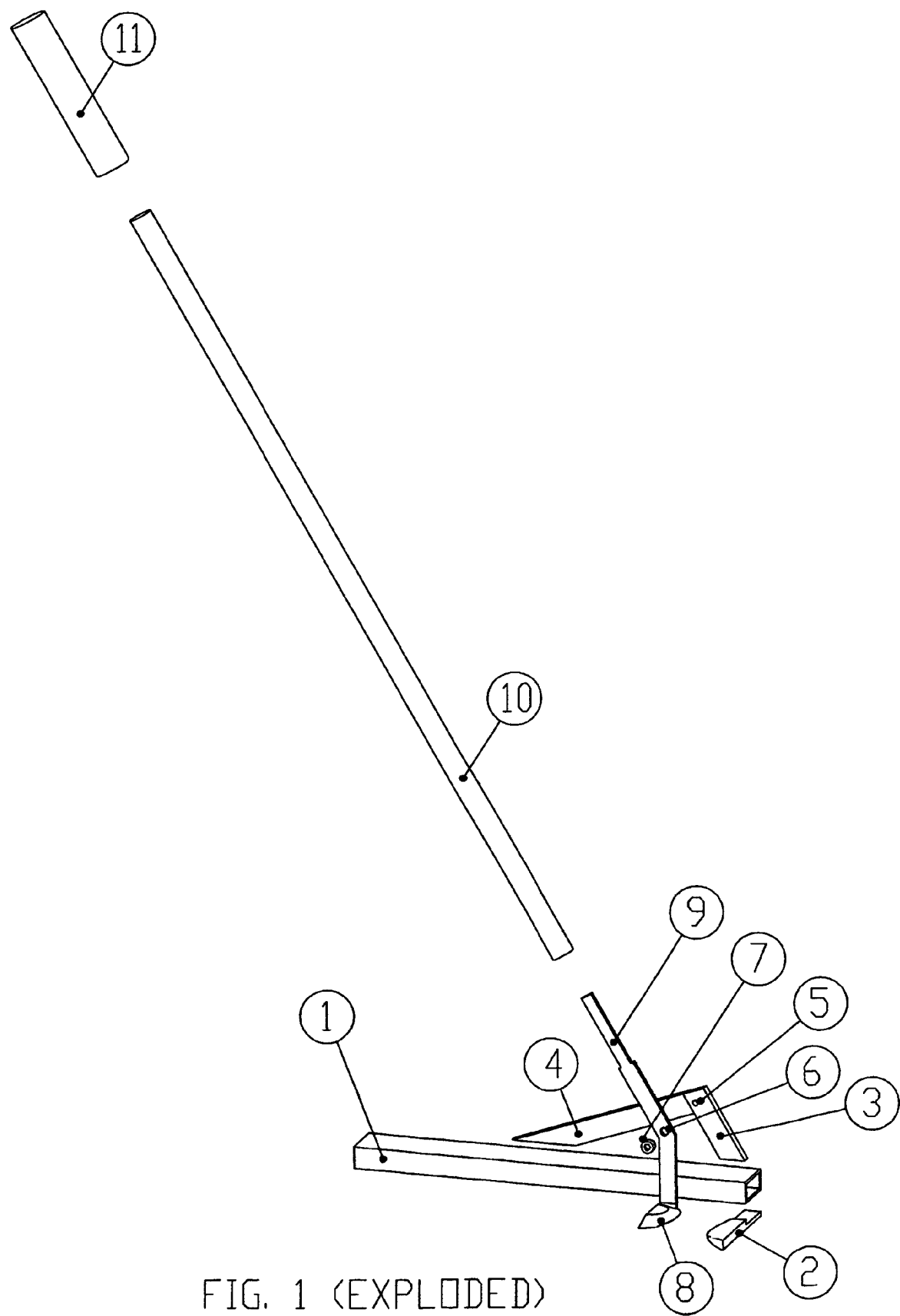
FIG. 1 (EXPLODED)

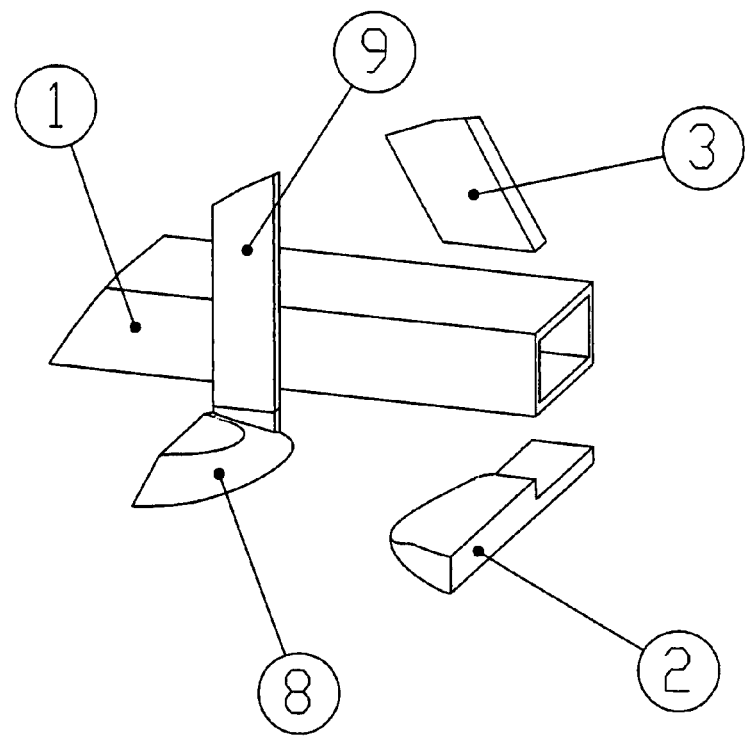
FIG. 2 (EXPLODED)
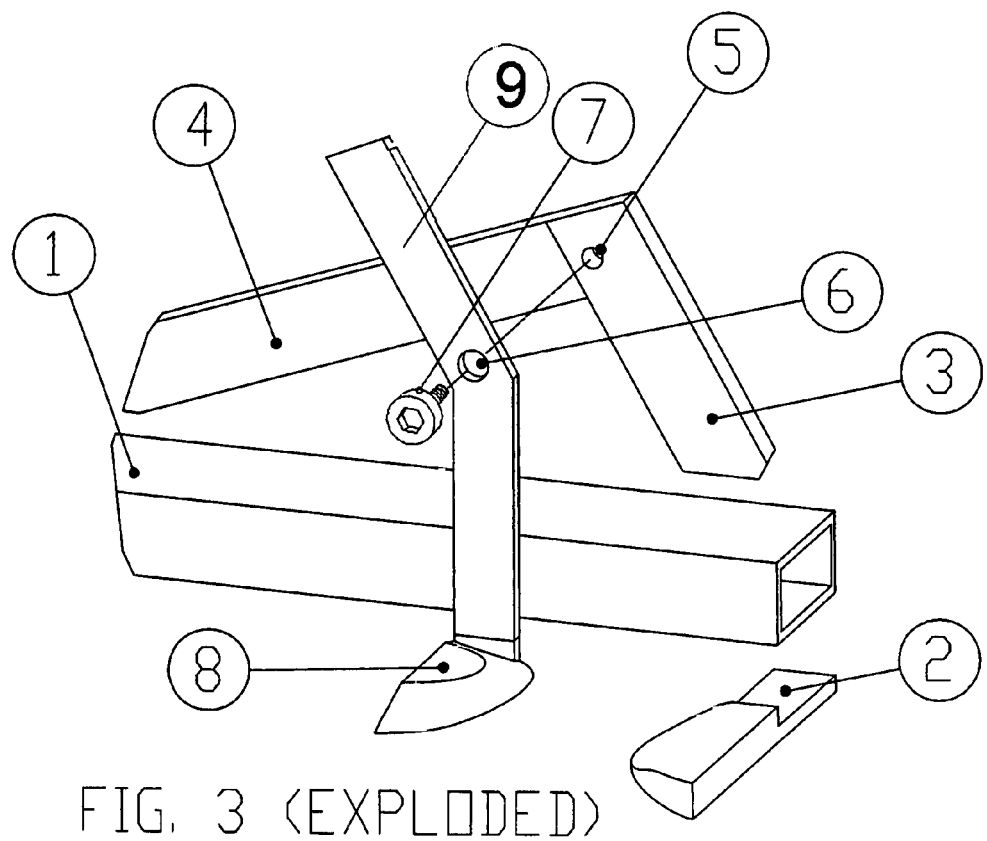
FIG. 3 (EXPLODED)

BRUSH CUTTING DEVICE

BACKGROUND OF THE INVENTION

The present invention relates generally to the field of hand operated landscaping equipment and more specifically to a lever operated cutting tool that allows a user to cut shrubs at ground level, from a standing position.

Traditional hand operated cutting tools that are used in landscaping include pruning shears, clippers, trimmers and loppers. Pruning shears are about the size of a large pair of scissors and are actuated in the same manner. The handle, and blades, of pruning shears are usually biased in the open position by a spring. Pruning shears are used for cutting the stems of flowers and small branches. Clippers and trimmers are similar to a pair of elongated scissors with elongated handles. Clippers and trimmers are usually one and half to two feet in length, with almost half of the length being taken up by the blades. Clippers and trimmers are used to trim new growth from bushes and shrubbery. Loppers have the same basic design as a pair of scissors, however, with loppers the handles are much longer than the blades. The long length of the handles, along with a cutting point that is close to the lopper's pivot point, allow loppers to cut larger diameter plants, including large branches and small limbs.

All of the above traditional, hand operated cutting devices operate on the same "scissors" cutting principle, wherein two blades are caused to rotate around the same pivot point. Such a design requires that the user grasp and exert force on two handles at once, with one handle being attached to each blade. This "scissors" design is fine for cutting small shrubbery that is knee-high and above. However, if the landscaper wants to cut a shrub off "at the roots", meaning that he wants to get rid of the shrub completely and cut it as close to ground level as possible, then the "scissors" design proves very cumbersome to use and lacking in regards to cutting force. All cutting tools with the scissors design require the user to lay on their stomach, or at least bend down on one knee, to cut a plant off "at the roots". Further, since cutting tools with the scissors design requires the user to grasp and exert force on both handles of the tool, even loppers have trouble cutting shrubs and small trees off "at the roots", because they are not able to generate enough cutting power.

What is needed in the field is a cutting tool that can be operated from the standing position that allows a user to cut a shrub off "at the roots". The ideal cutting device would make contact with the ground during operation and use the ground as a stabilizer, and to generate resistive force at the cutting point. The ideal cutting device would also include a long handle, for leverage, and the user would only be required to grasp and exert force on the single handle.

SUMMARY OF THE INVENTION

A hand operated cutting device that allows ground level cutting of shrubs and small trees from a standing position. The cutting device comprises a lever, a fulcrum and an attachment device. The lever includes a padded handle at a handle end of the lever, and a cutting blade at a cutting end of the lever. The fulcrum has a base that is adapted to contact the ground during operation, and an attachment point that allows for attachment of the lever. A second cutting blade is immovably attached to the front of the fulcrum's base, and the second blade is also adapted to contact the ground during operation. The attachment device provides for rotatable attachment of the lever to the attachment point on the fulcrum.

In the preferred embodiment, the attachment point on the fulcrum is further away from the front of the base than the leading edge of the second cutting blade. This allows for a smooth pendulum swing of the lever's blade over the top of the second cutting blade. The length of the lever is also preferably ten times the distance from the attachment point on the fulcrum, to the leading edge of the second blade. This allows multiplication by a factor of ten, of the force applied by the user to the lever. The preferred fulcrum comprises two support arms that form a triangle with the base, wherein one of the support arms is shorter than the other, and the shorter support arm is attached to the front of the base. This keeps the rotation point on the fulcrum close to the cutting point and also distributes the majority of the user applied force to the rear of the base. The lever is angled and includes a bend in a shank portion, which is located next to the cutting end of the lever. The lever is mechanically attached to the attachment point on the fulcrum at the bend in the shank portion. The base of the fulcrum and the second cutting blade are each made of metal, and the second cutting blade is welded to the front of the base. The two support arms are each also preferably made of metal, and the support arms are welded together, and to the base, to form the fulcrum. The attachment point on the fulcrum is preferably a threaded hole, the attachment device is a shoulder bolt, and the shoulder bolt is used to rotate-ably attach the lever to the fulcrum. The base of the fulcrum has a length that is approximately one third the length of the lever. Both cutting blades preferably have sharpened, leading edges that are curved.

It is an object of the present invention to provide a cutting tool that allows the user to cut a shrub off at the roots, or at ground level, without having to bend over or lay on the ground.

It is another object of the present invention to provide a cutting tool that allows more cutting force to be generated by the user than with traditional tools.

It is yet another object of the present invention to provide a cutting tool that is actuated by moving one lever downward, which allows a person to use their body weight to generate the cutting force.

BRIEF DESCRIPTION OF THE DRAWINGS

The invention of the present application will now be described in more detail with reference to the accompanying drawings, given only by way of example, in which:

FIG. 1 is an exploded view of the preferred embodiment of the present cutting tool;

FIG. 2 is close-up, exploded view of the cutting portion of the preferred embodiment;

FIG. 3 is a close-up, exploded view of the forward portion of the preferred embodiment showing the fulcrum and angled lever;

DETAILED DESCRIPTION OF THE INVENTION

Figure 4:
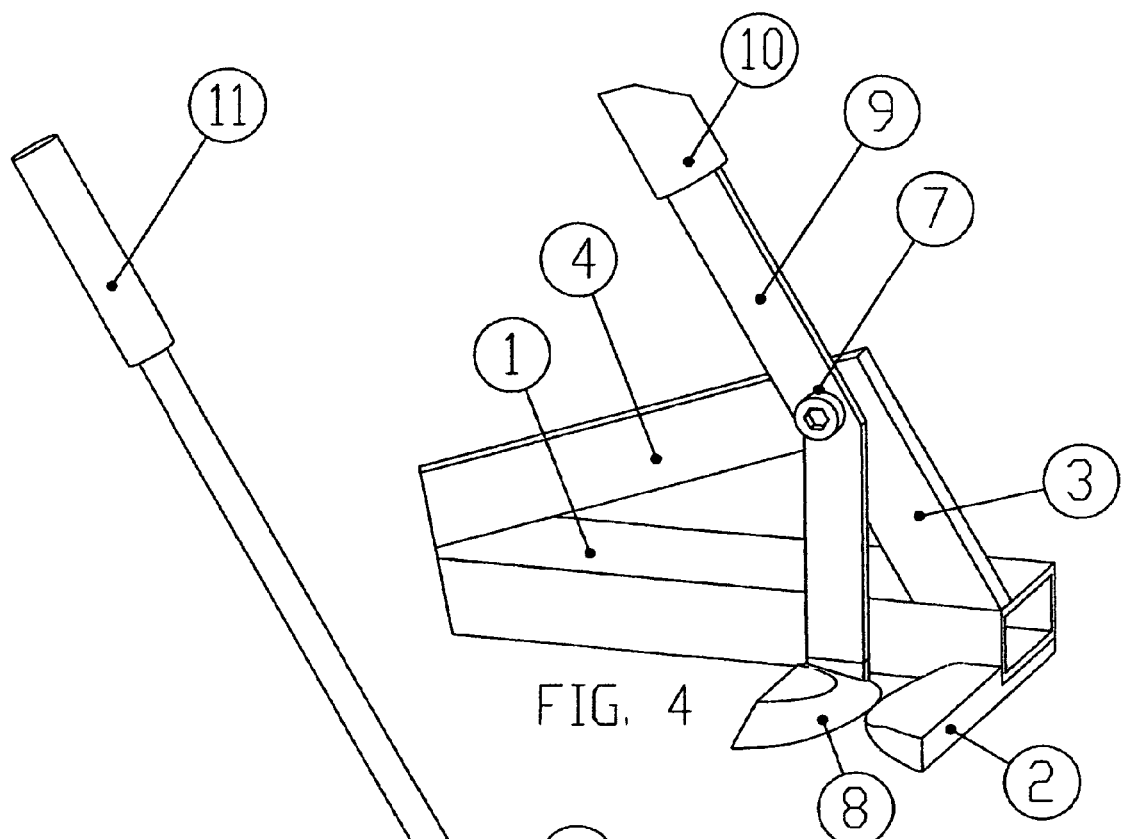
FIG. 4 shows the forward portion of the preferred embodiment with fulcrum and angled lever in their operational positions; and, FIG. 5 is a perspective view of the preferred embodiment.

The present invention fills a long felt need in the field of cutting tools for brush and shrubbery, by allowing a person to cut a shrub off "at the roots" and do so from a standing position. The user does not have to bend over, get down on one knee, or even lay on his belly to make a ground level cut, as is required with traditional, "scissors" designed, cutting tools. Besides eliminating the need to lay on the ground to make an "at the roots" cut, the present cutting tool also incorporates many fundamental principles of mechanics and physics in order to provide a superior cutting device. The extremely long handle takes maximum advantage of the principle of leverage. The sturdy base of the present device also lies on the ground during operation and the base effectively pushes against the earth when the user pushes on the handle. Since the earth is capable of providing infinite resistance, the earth effectively pushes back against the base of the present cutting tool, thereby effectively doubling the cutting force supplied by the user. The present device also incorporates a pendulum motion in the swing of the moving blade across and over the non-moving blade. This cutting motion allows the moving blade to pass completely over the fixed blade and provide a clean cut of the shrub being removed.

FIG. 1 is an exploded view of the preferred embodiment of the present cutting tool. The handle 10 forms the majority of the lever, however the entire lever in this embodiment consists of the handle pad 11, the handle 10, the shank 9 and the moving blade 8. The fulcrum in the preferred embodiment is provided by support bars 3 & 4, which attach to, and form a triangle with, the base 1 of the tool. The lever attaches to the fulcrum at hole 6 (on the lever) and threaded hole 5 (on the fulcrum), via shoulder bolt 7. A shoulder bolt has threading at the end of the shaft, however the shaft next to the head is smooth and provides a "shoulder" to rest on, and rotate about. Shoulder bolt 7 fits through hole 6 and threads into threaded hole 5. Hole 6 sits on the smooth shoulder of bolt 7 and allows the shank 9 to rotate about the shoulder bolt 7. The top portion of the shank 9 is tapered and designed to fit into and engage with the interior of the handle 10. The angle of the shank 9, along with the placement of the fulcrum and the angled edges of the two blades 8 & 2, allows the moving blade 8 to swing like a pendulum over the fixed blade 2.

In the preferred embodiment, the handle 10 is approximately 40 inches long and the base 1 is approximately one third the length of the handle, or 14 inches long. The handle 10 is made of a long steel bar with a circular cross section and the base is made from hardened tubular steel with a hollow square cross section. The support bars 3 & 4 for the fulcrum are each made from hardened flat steel bars. The shank 9 is made from a curved, hardened flat steel bar. The distance from the threaded hole 5 in the fulcrum to the cutting point, or the front of the fixed blade 2, is one-tenth the length of the handle, or 4 inches. This allows the lever to increase the user's force at the cutting point by a factor of ten. The support bars 3 & 4, and the fixed blade 2, are each welded to the base 1 so that they are able to withstand the forces generated by the present cutting tool. Of course, smaller and larger versions of the present tool can be provided in other embodiments to provided efficient cutting devices for smaller and larger shrubs and even trees.

FIG. 2 is close-up, exploded view of the cutting portion of the preferred embodiment. The fixed blade 2 includes an attachment portion that allows for easy attachment, or welding, to the bottom of the base 1. The fixed blade 2 is placed so that it forms a perpendicular extension to the base 1. The moving blade 8 is also preferably welded in place at the end of the shank 9 so that it too forms a perpendicular extension to the shank. Both blades 8 & 2 have cutting edges of equal or similar length and both blades are made of sharpened steel. The moving blade 8 is designed to just pass over the top of the fixed blade 2.

FIG. 3 is a close-up, exploded view of the forward portion of the preferred embodiment showing the fulcrum, support bars 3 & 4, and the angled portion of the lever, or shank 9. Support bar 3 is purposely designed to be shorter than support bar 4. This design provides stability to the fulcrum and also allows for proper placement of the rotation point for the lever. The threaded hole 5 must be positioned slightly past the leading edge of the fixed blade 2 (or further away from the front of the base 1) to ensure proper operation. A connection line in the figure shows the path that shoulder bolt 7 takes, through hole 6 and into threaded hole 5. Shoulder bolt 7 is preferably tightened by an Allen wrench.

FIG. 4 shows the forward portion of the preferred embodiment with the fulcrum and angled lever in their operational positions. As mentioned above, the support bars 3 & 4 are preferably welded to the base 1, and a shoulder bolt 7 is preferably used to attach the lever, via shank 9, to the fulcrum. The support bars 3 & 4 are positioned to be flush with the same side of the base 1 from which the fixed blade 2 extends. This allows for proper alignment of the moving blade 8 over the fixed blade 2. The force exerted by a user at the padded end of the handle 10 is multiplied by the leverage principle and acts against anything in front of the moving blade 8. The force exerted by the user on the handle 10 is also transferred to the base 1 of the cutting tool, primarily by support arm 4. Since the base 1, which lies on top of the ground during operation, does not sink into the ground, the ground effectively pushes back against the base 1. This push-back, or resistive, force provided by the ground is transferred from the base 1 to the fixed blade 2 that is permanently attached to the front of the base, and this push-back force acts against anything in front of the fixed blade 2. Thus, the leveraged cutting power provided by blade 8 at the cutting point is effectively doubled by the resistive force provided by fixed blade 2. It should also be noted that the standup design of the present tool advantageously requires that only one handle be pushed downward for regular operation of the cutting device. Thus, a landscaper can use his body weight to help push the handle downward, and thereby generate more cutting force than is possible with traditional cutting tools. The curved cutting edges of the two blades 8 & 2 also concentrates the extreme cutting force in a small area, at least initially, and thereby maximizes the penetrating force of the cutting tool.

Figure 5:
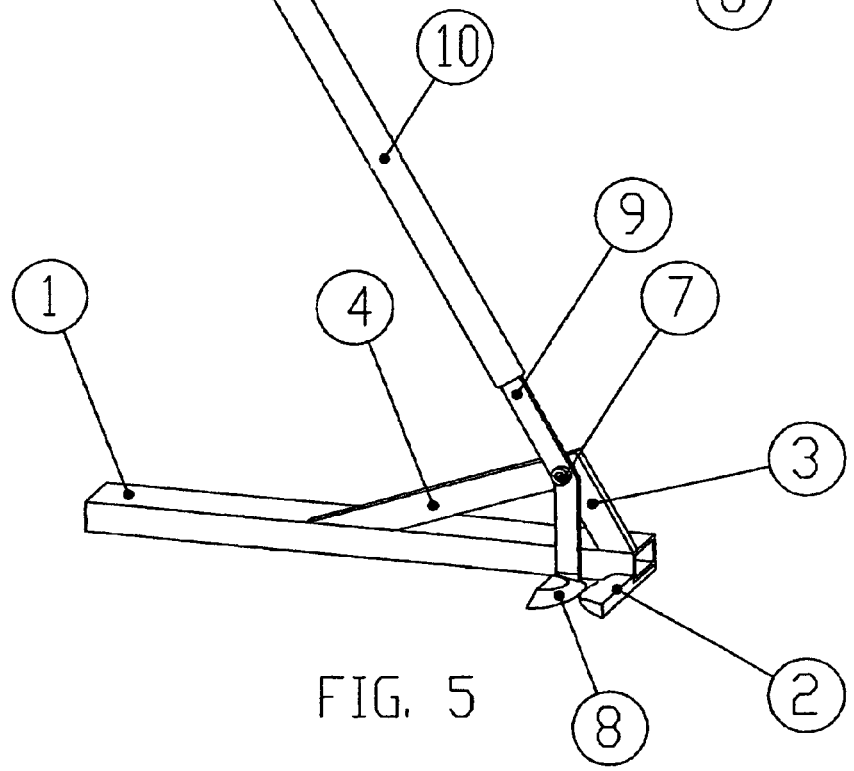

FIG. 5 is a perspective view of the preferred embodiment of the present lever cutting device that allows ground level cutting of shrubs and small trees from a standing position. In operation, the handle 10 is raised to create space in between the two cutting blades 8 & 2. The forward, or cutting, portion of the device is then placed under a shrub or tree to be cut, with the base 1 laying on the ground and the stem or trunk of the plant positioned in between the two blades 8 & 2. The user then grasps the handle pad 11 and pulls, and/or pushes, the handle 10 downward. The user applied force is multiplied by leverage, and doubled by resistance, and applied by the two blades 8 & 2 to the trunk of the plant. Since the moving blade 8 is able to pass completely over the fixed blade 2, a clean cut of the trunk is provided by the present tool.

The foregoing description of the specific embodiments will so fully reveal the general nature of the invention that others can, by applying current knowledge, readily modify and/or adapt for various applications such specific embodiments without departing from the generic concept. For example, the base could be wider or have a horizontal support structure added for horizontal stability. Therefore, such adaptations and modifications should and are intended to be comprehended within the meaning and range of equivalents of the disclosed embodiments. It is to be understood that the phraseology of terminology employed herein is for the purpose of description and not of limitation.

What is claimed:

1. A hand operated cutting device that allows ground level cutting of shrubs and small trees from a standing position, the cutting device comprising:
   a lever, the lever having a handle at a handle end of the lever, and a cutting blade at a cutting end of the lever;
   a fulcrum, the fulcrum having a base that is adapted to contact a ground during operation and an attachment point that allows for attachment of the lever, wherein a second cutting blade is attached to a front of the base, and the second blade is also adapted to contact the ground during operation; and,
   an attachment device, wherein the attachment device provides for rotatable attachment of the lever to the attachment point on the fulcrum, and wherein the fulcrum further comprises first and second support arms that together with the base form a triangle, and wherein the first support arm is shorter than the second support arm, and the first support arm is attached to the front of the base.

2. The cutting device of claim 1, wherein the attachment point on the fulcrum is further away from the front of the base than a leading edge of the second cutting blade.

3. The cutting device of claim 2, wherein the attachment point on the fulcrum is a first distance away from the leading edge of the second blade, and the handle end of the lever is a second distance away from the attachment point on the fulcrum, and the second distance is at least four times the first distance.

4. The cutting device of claim 2, wherein the blade at the cutting end of the lever passes across the leading edge of the second blade and over a top of the second blade when the handle is moved downward.

5. The cutting device of claim 1, wherein the lever includes a bend in a shank portion of the lever that is located next to the cutting end, and wherein the shank portion of the lever is mechanically attached to the attachment point on the fulcrum.

6. The cutting device of claim 1, wherein the base of the fulcrum is made of metal, the second cutting blade is also made of metal, and the second cutting blade is welded to the front of the base.

7. The cutting device of claim 1, wherein the base and the first and second support arms are each made of metal and the support arms are welded together, and to the base, to form the fulcrum.

8. The cutting device of claim 1, wherein the attachment point on the fulcrum is a threaded hole, the attachment device is a shoulder bolt, the lever includes a hole located close to the cutting end, and the shoulder bolt is used to rotatable attach the lever to the fulcrum.

9. The cutting device of claim 1, wherein the blade at the cutting end of the lever and the second cutting blade are each made of sharpened steel.

10. The cutting device of claim 1, wherein the base of the fulcrum has a first length, a distance from the handle end of the lever to the attachment point is defined by a second length, and the second length is at least twice that of the first length.

11. The cutting device of claim 1, wherein at least one of the cutting blades has a sharpened leading edge that is curved.

12. A lever actuated cutting device that is adapted to lay on top of, and be supported by, a ground during operation, the device allows for efficient removal of a shrub by cutting the shrub off at the roots, meaning at ground level, the cutting device takes advantage of principles of leverage and resistance, and also incorporates a swinging motion of a pendulum, the cutting device comprising:
   an angled lever, the lever having a handle attached to a handle end, a cutting blade attached to a cutting end, and a hole that is centrally located at a bend in the angled lever;
   a fulcrum, the fulcrum having an elongated base that is adapted to contact the ground during operation, a long support arm that is attached to a middle of the base, a short support arm that is attached to a front of the base, and a threaded hole that is housed within a junction of the long and short support arms, wherein the front of the base also has a second cutting blade attached thereto; and,
   a shoulder bolt that fits through the hole in the lever and threads into the threaded hole in the fulcrum, wherein the bolt provides rotatable attachment of the lever to the fulcrum.

13. The cutting device of claim 12, wherein the cutting blade at the cutting end of the lever is attached at a right angle to the lever, and the second cutting blade attached to the front of the base is attached at a right angle to the base.

14. The cutting device of claim 12, wherein the bend in the lever is closer to the cutting end of the lever and further away from the handle end of the lever.

* * * * *